United States Patent
Lan

(10) Patent No.: US 11,630,795 B2
(45) Date of Patent: Apr. 18, 2023

(54) RS-485 CIRCUIT AND COMMUNICATION SYSTEM

(71) Applicant: Feature Integration Technology Inc., Hsinchu (TW)

(72) Inventor: Yu-Lin Lan, Hsinchu (TW)

(73) Assignee: Feature Integration Technology Inc., Hsinchu (TW)

( * ) Notice: Subject to any disclaimer, the term of this patent is extended or adjusted under 35 U.S.C. 154(b) by 0 days.

(21) Appl. No.: 17/544,962

(22) Filed: Dec. 8, 2021

(65) Prior Publication Data

US 2022/0382704 A1    Dec. 1, 2022

(30) Foreign Application Priority Data

May 28, 2021  (TW) ................................. 110119561
Oct. 18, 2021  (TW) ................................. 110138606

(51) Int. Cl.
*G06F 13/40* (2006.01)
(52) U.S. Cl.
CPC ................................ *G06F 13/4072* (2013.01)
(58) Field of Classification Search
CPC ............................. G06F 13/4072; H04B 1/44
See application file for complete search history.

(56) References Cited

U.S. PATENT DOCUMENTS

| | | | | |
|---|---|---|---|---|
| 2001/0050905 A1* | 12/2001 | Shin | ...................... | G06F 13/385 370/296 |
| 2006/0245515 A1* | 11/2006 | Tachi | .................. | H04L 25/0262 375/293 |
| 2014/0281074 A1* | 9/2014 | Jang | ..................... | G06F 13/4282 710/106 |
| 2015/0270863 A1* | 9/2015 | Patton, Jr. | ................. | H04L 5/16 375/219 |

FOREIGN PATENT DOCUMENTS

CN    112713910 B  *  8/2022 ............... H04B 1/44

* cited by examiner

*Primary Examiner* — Phong H Dang

(57) ABSTRACT

Disclosed is an RS-485 circuit, which includes an RS-485 interface chip, a start detector, a control module and a counter. The RS-485 interface chip includes a data input terminal and an enable terminal, wherein the data input terminal is configured to receive a data signal, the enable terminal is configured to receive a start signal or a switching signal to make the RS-485 interface chip in a data transmitting state or a data receiving state. The start detector is configured to detect a first signal edge of the data signal to generate the start signal to the enable terminal. After detecting the first signal edge of the data signal, the control module outputs first counting information. The counter is configured to count based on the first counting information, and output the switching signal to the enable terminal when the counter expires.

18 Claims, 5 Drawing Sheets

RS-485 CIRCUIT AND COMMUNICATION SYSTEM

CROSS REFERENCE TO RELATED APPLICATION

This application claims the priority benefit of Taiwan Patent Application Serial Number 110119561 filed on May 28, 2021, and Taiwan Patent Application Serial Number 110138606, filed on Oct. 18, 2021, both of which are hereby incorporated by reference in their entireties.

BACKGROUND

Technical Field

The present disclosure relates to a communication interface circuit, and particularly relates to an RS-485 circuit and a communication system.

Related Art

The RS-485 is a common serial communication standard, which provides a communication method including balanced sending and differential receiving for the communication between two devices.

The electrical characteristic of the RS-485 is a half-duplex mode, which makes it impossible to simultaneously send and receive data between two devices through the RS-485 interface. Therefore, only one device of the two devices communicate with each other through the RS-485 interface may transmit data at one time; if another device of the two devices needs to transmit data, it must wait for the device that is transmitting data to complete the data transmission before transmitting data.

Generally speaking, it is necessary to output a control signal to a RS-485 interface chip through a processing module (e.g., a microprocessor, a central processing unit and a single-chip microcomputer) of a device to realize the switch of the data receiving state and the data sending state of the RS-485 interface chip. However, in the above method, additional I/O terminals and software codes need to be added to the processing module of the device to realize the control of state switching, which causes the problems of increasing the workload of software development, wasting human resources for research and development, and wasting the I/O resources of the processing module.

SUMMARY

The present disclosure provides an RS-485 circuit and a communication system, which solve the problems of increasing the workload of software development, wasting human resources for research and development, and wasting the I/O resources of a processing module since it is necessary to add additional I/O ports and software codes to the processing module of the device to control the state switching.

In order to solve the above technical problems, the present disclosure is implemented as follows.

According to a first aspect, the present disclosure provides an RS-485 circuit, which is disposed in an electronic device comprising a processing module. The RS-485 circuit comprises an RS-485 interface chip, a start detector, a control module and a counter. The RS-485 interface chip comprises a data input terminal and an enable terminal. The data input terminal is configured to receive a data signal from a processing module. The enable terminal is configured to receive a start signal to make the RS-485 interface chip in a data transmitting state, and receive a switching signal to make the RS-485 interface chip in a data receiving state. The start detector is configured to detect a first signal edge of the data signal to generate the start signal to the enable terminal. The control module is configured to output first counting information after detecting the first signal edge of the data signal. The counter is configured to count based on the first counting information, and output the switching signal to the enabling terminal when the counter expires.

According to a second aspect, the present disclosure provides a communication system, which comprises a processing module, a communication bus, and an RS-485 circuit, wherein the RS-485 circuit is connected to the processing module through the communication bus. The RS-485 circuit comprises an RS-485 interface chip, a start detector, a control module and a counter. The RS-485 interface chip comprises a data input terminal and an enable terminal. The data input terminal is configured to receive a data signal from a processing module. The enable terminal is configured to receive a start signal to make the RS-485 interface chip in a data transmitting state, and receive a switching signal to make the RS-485 interface chip in a data receiving state. The start detector is configured to detect a first signal edge of the data signal to generate the start signal to the enable terminal. The control module is configured to output first counting information after detecting the first signal edge of the data signal. The counter is configured to count based on the first counting information, and output the switching signal to the enabling terminal when the counter expires.

In the present disclosure, by the settings of the start detector, the control module and the counter, the RS-485 circuit may automatically determine the data transmission direction and transmission time of the RS-485 interface chip in a hardware mode, so as to avoid errors in data transmission because the transmission direction is switched before the data is completely transmitted or the transmission direction is not switched in time after the data transmission is completed, and solve the problems of increasing the workload of software development, wasting human resources for research and development, and wasting the I/O resources of the processing module since it is necessary to add additional I/O ports and software codes to the processing module of the device to control the state switching.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
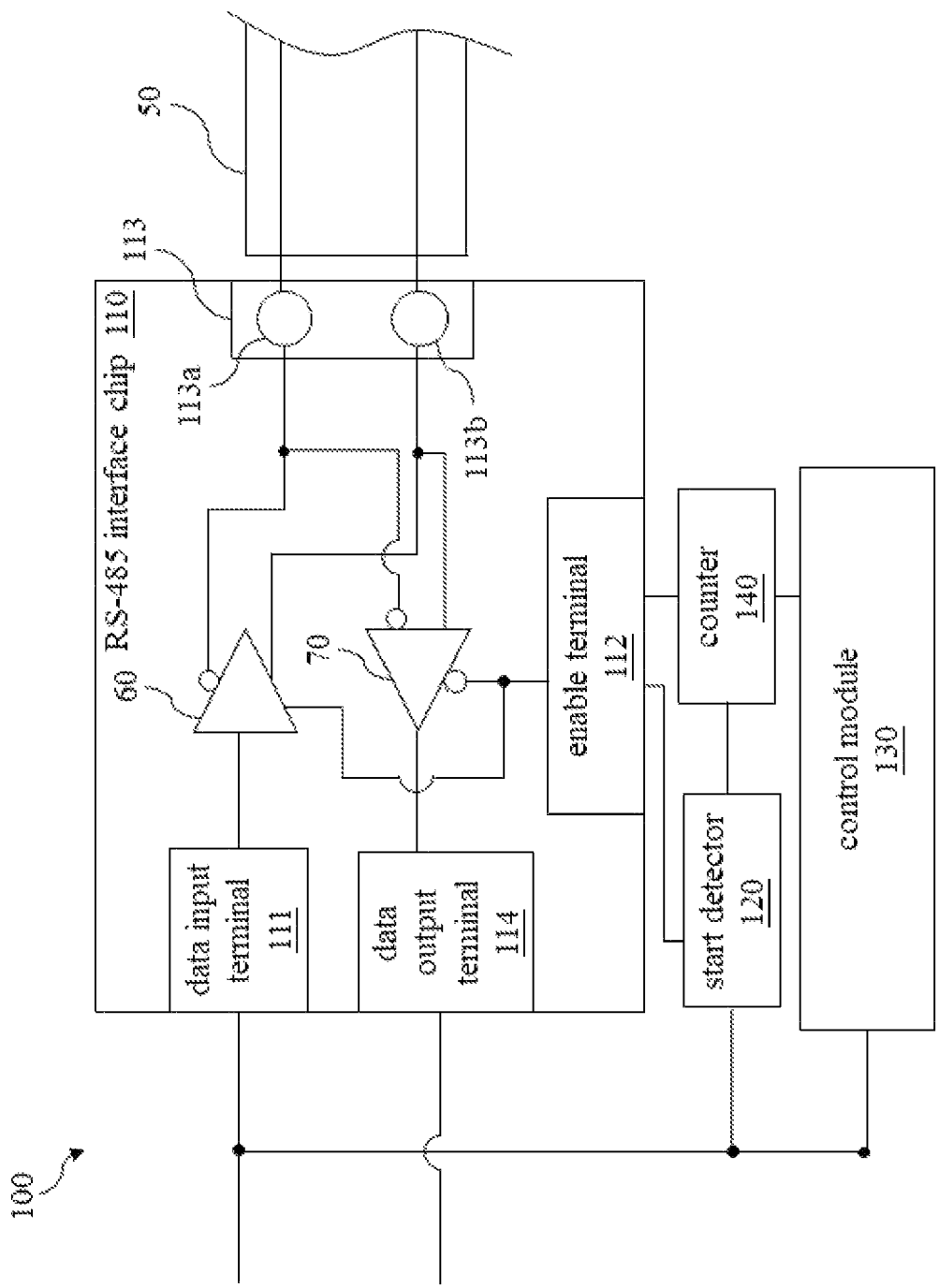
FIG. 1 is a block diagram of an RS-485 circuit according to a first embodiment of the present disclosure.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

It must be understood that when a component is described as being "connected" or "coupled" to (or with) another component, it may be directly connected or coupled to other components or through an intermediate component. In contrast, when a component is described as being "directly connected" or "directly coupled" to (or with) another component, there are no intermediate components. In addition, unless specifically stated in the specification, any term in the singular case also comprises the meaning of the plural case.

In the following embodiment, the same reference numerals are used to refer to the same or similar elements throughout the disclosure.

Please refer to FIG. 1, which is a block diagram of an RS-485 circuit according to a first embodiment of the present disclosure. As shown in FIG. 1, in this embodiment, the RS-485 circuit 100 is disposed in an electronic device (not drawn) that includes a processing module (not drawn), and the RS-485 circuit 100 comprises an RS-485 interface chip 110, a start detector 120, a control module 130 and a counter 140, wherein the start detector 120, the control module 130 and the counter 140 are respectively connected to the RS-485 interface chip 110. The RS-485 interface chip 110 may be connected to other RS-485 interface chip (not drawn), so that the electronic device equipped with the RS-485 interface chip 110 may send data to the electronic device equipped with the other RS-485 interface chip (not drawn) through the RS-485 bus 50 and receive data from the electronic device equipped with the other RS-485 interface chip through the RS-485 bus 50.

In this embodiment, the RS-485 interface chip 110 comprises a data input terminal 111 and an enable terminal 112. The data input terminal 111 is configured to receive a data signal from the processing module. The enable terminal 112 is configured to receive a start signal to make the RS-485 interface chip 110 in a data transmitting state, and receive a switching signal to make the RS-485 interface chip 110 in a data receiving state. It should be noted that when the RS-485 interface chip 110 may be preset to be in the data receiving state, the data signal may be preset but not limited to be a high level signal, and the signal received by the enable terminal 112 may be preset but not limited to be a high level signal; when the data signal starts to undergo a signal state transition (that is, the data signal includes a signal edge), it means that the device equipped with the RS-485 interface chip 110 starts to transmit data, and needs to be switched to the data transmitting state. However, this embodiment is not intended to limit the present disclosure. For example, when the RS-485 interface chip 110 may be preset to in the data receiving state, the data signal may also be preset to be a low level signal, and the signal received by the enable terminal 112 may also be preset to be a low level signal.

In this embodiment, the start detector 120 is configured to detect a first signal edge of the data signal to generate the start signal to the enable terminal 112. In other words, when the data signal starts to undergo a signal state transition (that is, the data signal includes a signal edge), it means that the device equipped with the RS-485 interface chip 110 will start to transmit data. Therefore, the start detector 120 is activated to generate and transmit the start signal to the enable terminal 112 when the first signal edge of the data signal is detected, so that the RS-485 interface chip 110 is switched to the data transmitting state. When the data signal is preset as a high-level signal, the first signal edge may be a falling edge. When the data signal is preset as a low-level signal, the first signal edge may be a rising edge. The first signal edge may be adjusted according to actual demands.

In this embodiment, the control module 130 is configured to output first counting information after detecting the first signal edge of the data signal.

In this embodiment, the counter 140 is configured to count based on the first counting information, and output the switching signal to the enable terminal 112 when the count expires. When the counter 140 counts to the count value included in the first counting information, it means that the counter 140 expires, and it also means that the data transmission is completed.

In one embodiment, when the RS-485 interface chip 110 may be preset to be in the data receiving state and the signal received by the enable terminal 112 may be preset to a high level signal, the start signal may be a low level signal, and the switching signal may be a high-level signal. In another embodiment, when the RS-485 interface chip 110 may be preset to in the data receiving state and the signal received by the enable terminal 112 may be preset to be a low level signal, the start signal may be a high level signal, and the switching signal may be a low level signal.

In one embodiment, the RS-485 interface chip 110 may further comprise a differential signal transceiver terminal 113. When the RS-485 interface chip 110 is in the data transmitting state, the RS-485 interface chip 110 outputs a differential signal to the RS-485 bus 50 through the differential signal transceiver terminal 113 based on the data signal received by the data input terminal 111. When the RS-485 interface chip 110 is in the data receiving state, the RS-485 interface chip 110 receives another differential signal from the RS-485 bus 50 through the differential signal transceiver terminal 113. In more detail, the differential signal transceiver terminal 113 may comprise a differential signal pin 113a and a differential signal pin 113b, wherein when the RS-485 interface chip 110 is in the data transmitting state, the RS-485 interface chip 110 outputs a differential signal to the RS-485 bus 50 through the differential signal pin 113a and the differential signal pin 113b based on the data signal received by the data input terminal 111; and when the RS-485 interface chip 110 is in the data receiving state, the RS-485 interface chip 110 receives another differential signal from the RS-485 bus 50 through the differential signal pin 113a and the differential signal pin 113b.

In one embodiment, the RS-485 interface chip 110 may further comprise a data output terminal 114. When the RS-485 interface chip 110 is in the data receiving state, the RS-485 interface chip 110 outputs another data signal through the data output terminal 114 based on the another differential signal received by the differential signal transceiver terminal 113.

In one embodiment, the RS-485 interface chip 110 comprises a differential transmitting unit 60 and a differential receiving unit 70, wherein the input terminal of the differential transmitting unit 60 is connected to the data input terminal 111, the output terminal of the differential transmitting unit 60 is connected to the differential signal transceiver terminal 113, and the control terminal of the differential transmitting unit 60 is connected to the enable terminal 112; and the input terminal of the differential receiving unit 70 is connected to the differential signal transceiver terminal 113, the output terminal of the differential receiving unit 70 is connected to the data output terminal 114, and the control terminal of the differential receiving unit 70 is connected to the enable terminal 112. It should be noted that when the RS-485 interface chip 110 is preset to be in the data receiving state, the differential transmitting unit 60 can not operate, and the differential receiving unit 70 can operate; and when the RS-485 interface chip 110 is preset to be in the data transmitting state, the differential transmitting unit 60 can operate, and the differential receiving unit 70 can not operate.

In one embodiment, when detecting the first signal edge of the data signal, the start detector 120 generates another start signal to the counter 140 to start the counter 140.

In one embodiment, the start detector 120 generates the start signal when the first signal edge is detected after the counter 140 expires.

Figure 2:
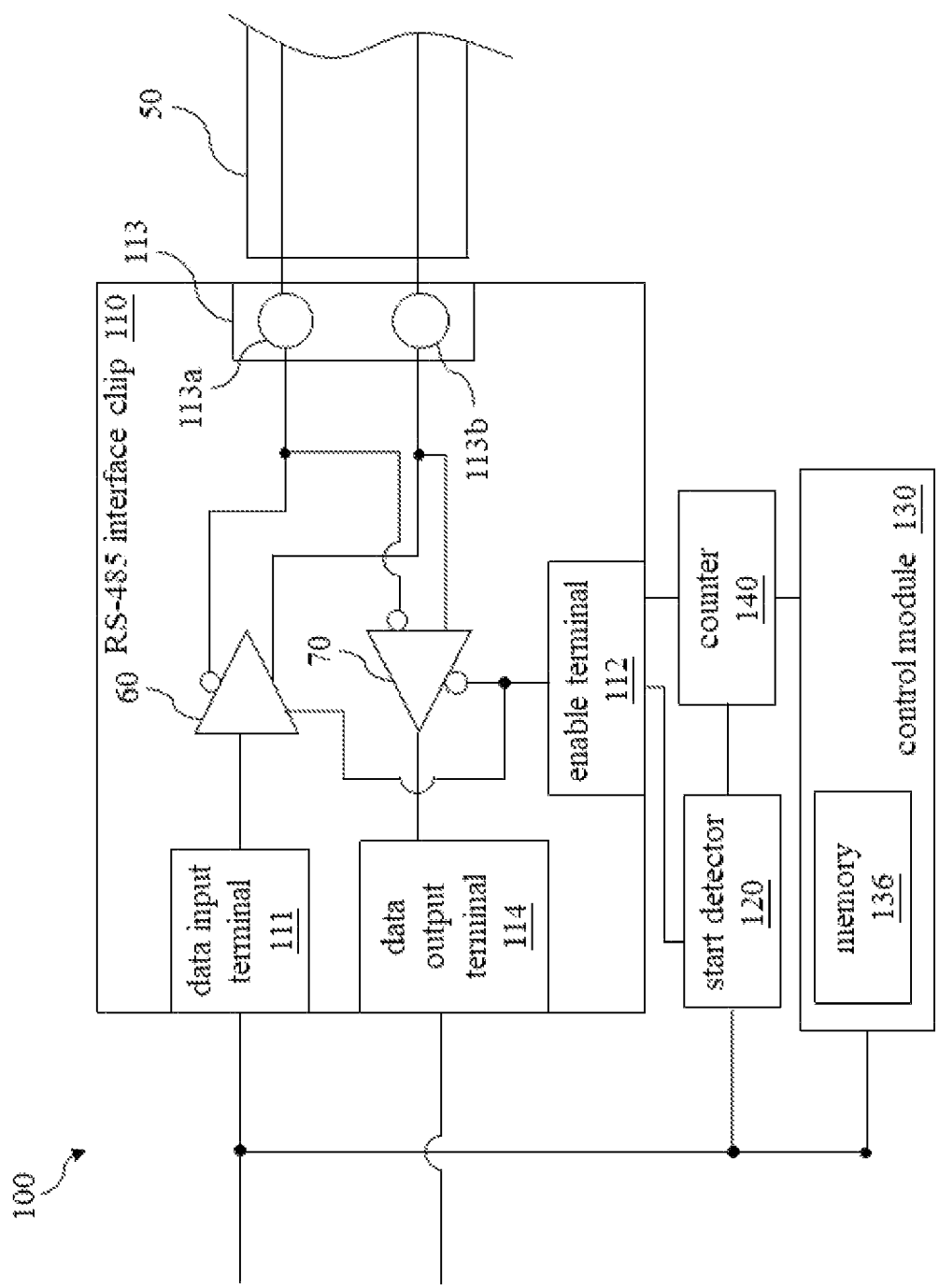
FIG. 2 is a block diagram of an RS-485 circuit according to a second embodiment of the present disclosure.

In one embodiment, please refer to FIG. 2, which is a block diagram of an RS-485 circuit according to a second embodiment of the present disclosure. As shown in FIG. 2, the first counting information is the preset counting information, and the preset counting information is stored in the memory 136 included in the control module 130. Therefore, in this embodiment, the RS-485 interface chip 110 can be in the data transmitting state within a preset time after the control module 130 detects the first signal edge of the data signal (the preset time corresponds to the count value included in the preset counting information), and after the preset time, the RS-485 interface chip 110 is switched from the data transmitting state to the data receiving state. However, this embodiment is not intended to limit the present disclosure, and can be adjusted according to actual needs.

The preset counting information may be set or adjusted according to empirical rules or actual needs.

Figure 3:
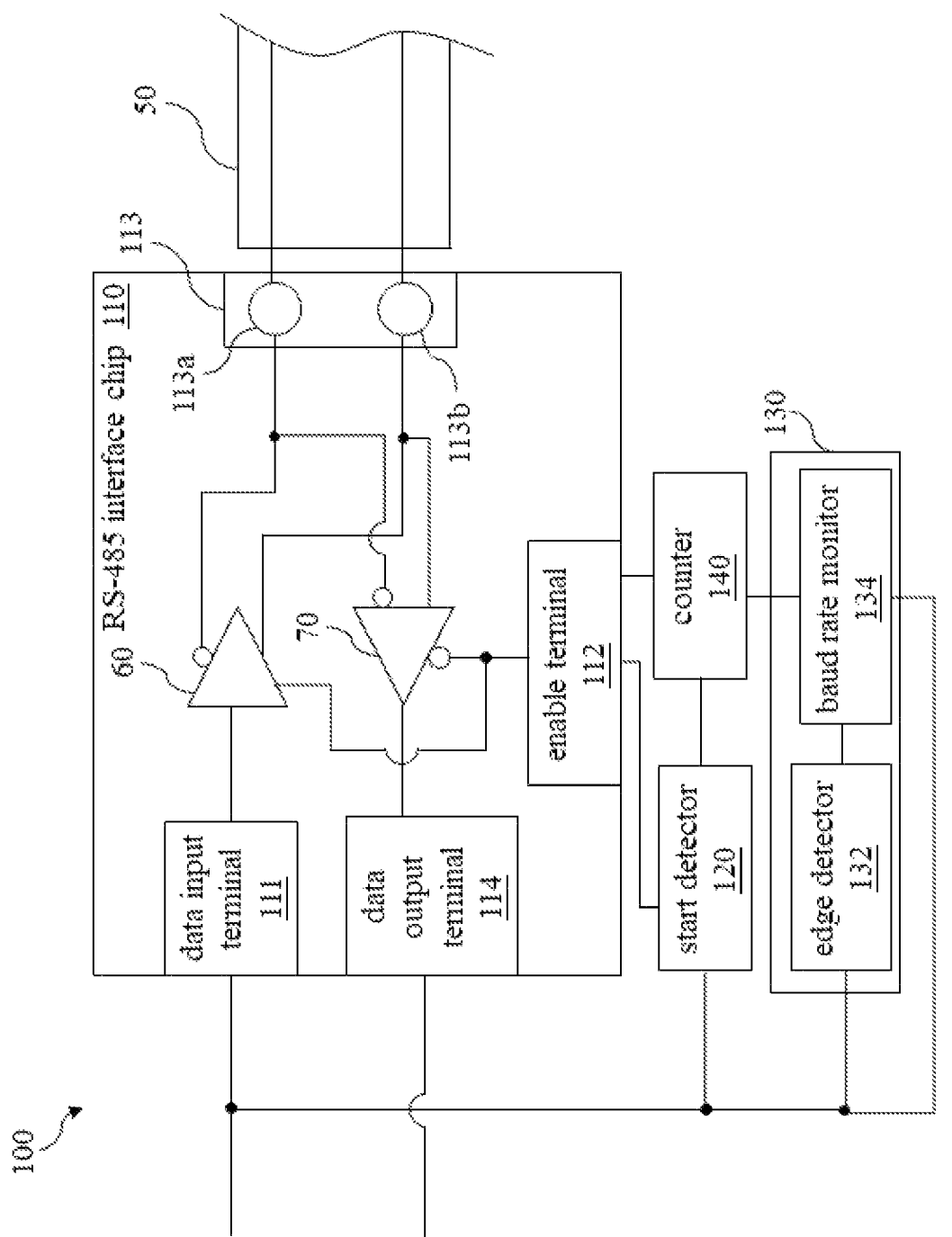
FIG. 3 is a block diagram of an RS-485 circuit according to a third embodiment of the present disclosure.

In one embodiment, please refer to FIG. 3, which is a block diagram of an RS-485 circuit according to a third embodiment of the present disclosure. As shown in FIG. 3, the control module 130 may comprise an edge detector 132 and a baud rate monitor 134, the edge detector 132 is connected to the data input terminal 111, the baud rate monitor 134 is connected to the edge detector 132, the data input terminal 111 and the counter 140. The edge detector 132 is configured to continuously detect the signal edge of the data signal. The baud rate monitor 134 is configured to continuously obtain the current baud rate according to the data signal after the edge detector 132 detects the signal edge of the data signal, and obtain the current counting information as the first counting information based on the data signal and the current baud rate, so as to output the first counting information to the counter 140. Therefore, in this embodiment, the RS-485 interface chip 110 may be in the data transmitting state while the counter 140 counts according to the count value included in the current counting information, and after the counter 140 expires, the RS-485 interface chip 110 is switched from the data transmitting state to the data receiving state. However, this embodiment is not intended to limit the present disclosure, and can be adjusted according to actual needs.

Figure 4:
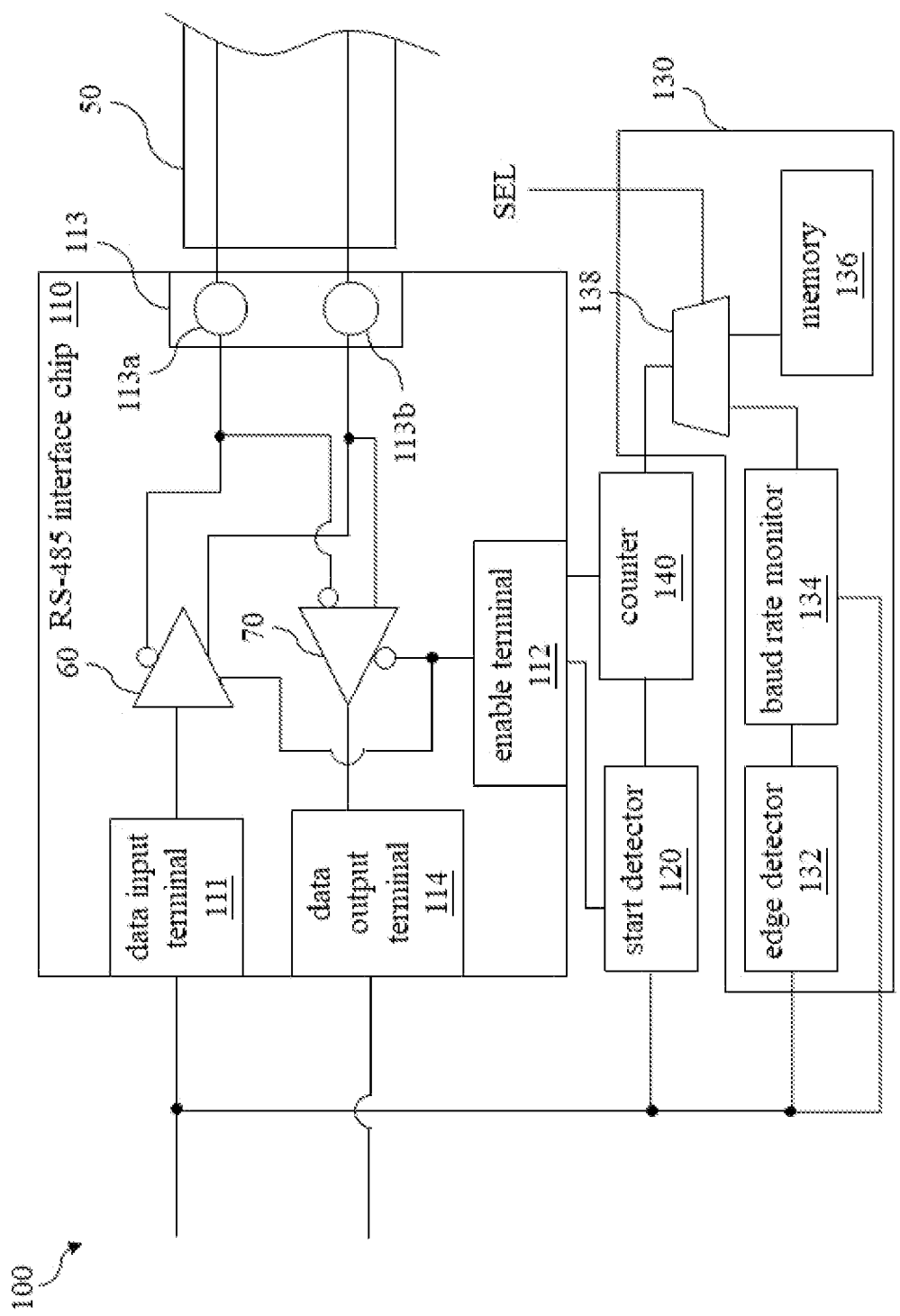
FIG. 4 is a block diagram of an RS-485 circuit according to a fourth embodiment of the present disclosure.

In one embodiment, please refer to FIG. 4, which is a block diagram of an RS-485 circuit according to a fourth embodiment of the present disclosure. As shown in FIG. 4, the control module 130 may comprise an edge detector 132, a baud rate monitor 134, a memory 136 and a multiplexer 138, wherein the edge detector 132 is connected to the data input terminal 111, the baud rate monitor 134 is connected to the edge detector 132 and the data input terminal 111, and the multiplexer 138 is connected to the baud rate monitor 134, the memory 136 and the counter 140. The edge detector 132 is configured to continuously detect the signal edge of the data signal. The baud rate monitor 134 is configured to continuously obtain the current baud rate according to the data signal after the edge detector 132 detects the signal edge of the data signal, and obtain current counting information based on the data signal and the current baud rate. The memory 136 is configured to store the preset counting information. The multiplexer 138 is configured to select one of the preset counting information and the current counting information as the first counting information according to the control of the selection signal SEL, and output the first counting information to the counter 140, wherein the selection signal SEL may be output by the processing module that provides the data signal. In one example, when the selection signal SEL is a high level signal, the multiplexer 138 outputs the preset counting information to the counter 140; and when the selection signal SEL is a low level signal, the multiplexer 138 outputs the current counting information to the counter 140. However, this embodiment is not intended to limit the present disclosure, and can be adjusted according to actual needs. For example, when the selection signal SEL is a low level signal, the multiplexer 138 outputs the preset counting information to the counter 140; and when the selection signal SEL is a high level signal, the multiplexer 138 outputs the current counting information to the counter 140.

It should be noted that by the setting of the multiplexer 138, the first counting information received by the counter 140 may be selectively the preset counting information or the current counting information. That is, the first count information may change at any time due to changes in the selection signal SEL. When the counter 140 receives the new first counting information (that is, the first counting information changes), the counter 140 re-count according to the count value included in the new first counting information, and until the counter 140 counts to the count value included in the new first counting information, it means that the counter 140 expires.

In one embodiment, the baud rate monitor 134 is further configured to monitor the data length of the data signal, continuously obtain the current baud rate according to the detection result of the edge detector 132 after the edge detector 132 detects the signal edge of the data signal, and output the current counting information to the counter 140 based on the data length and the current baud rate. Since the current counting information is output based on the data length of the data signal and the current baud rate, it means that the data transmission is completed when the counter 140 expires.

It should be noted that, since the baud rate monitor 134 outputs the current counting information based on the data length of the data signal and the current baud rate, it means that the current counting information varies due to the data length of different data signals. When the counter 140 receives the current counting information as the first counting information and the current counting information changes (that is, the count value included in the current counting information changes), the counter 140 re-counts based on the current counting information, and until the counter 140 counts to the new count value included in the updated current count information, it means that the counter 140 expires. Therefore, the RS-485 circuit 100 may switch the state of the RS-485 interface chip 110 in real time after the data transmission is completed by setting up the start detector 120, the control module 130 and the counter 140 (i.e., the RS-485 interface chip 110 is switched from the data transmitting state to the data receiving state).

Figure 5:
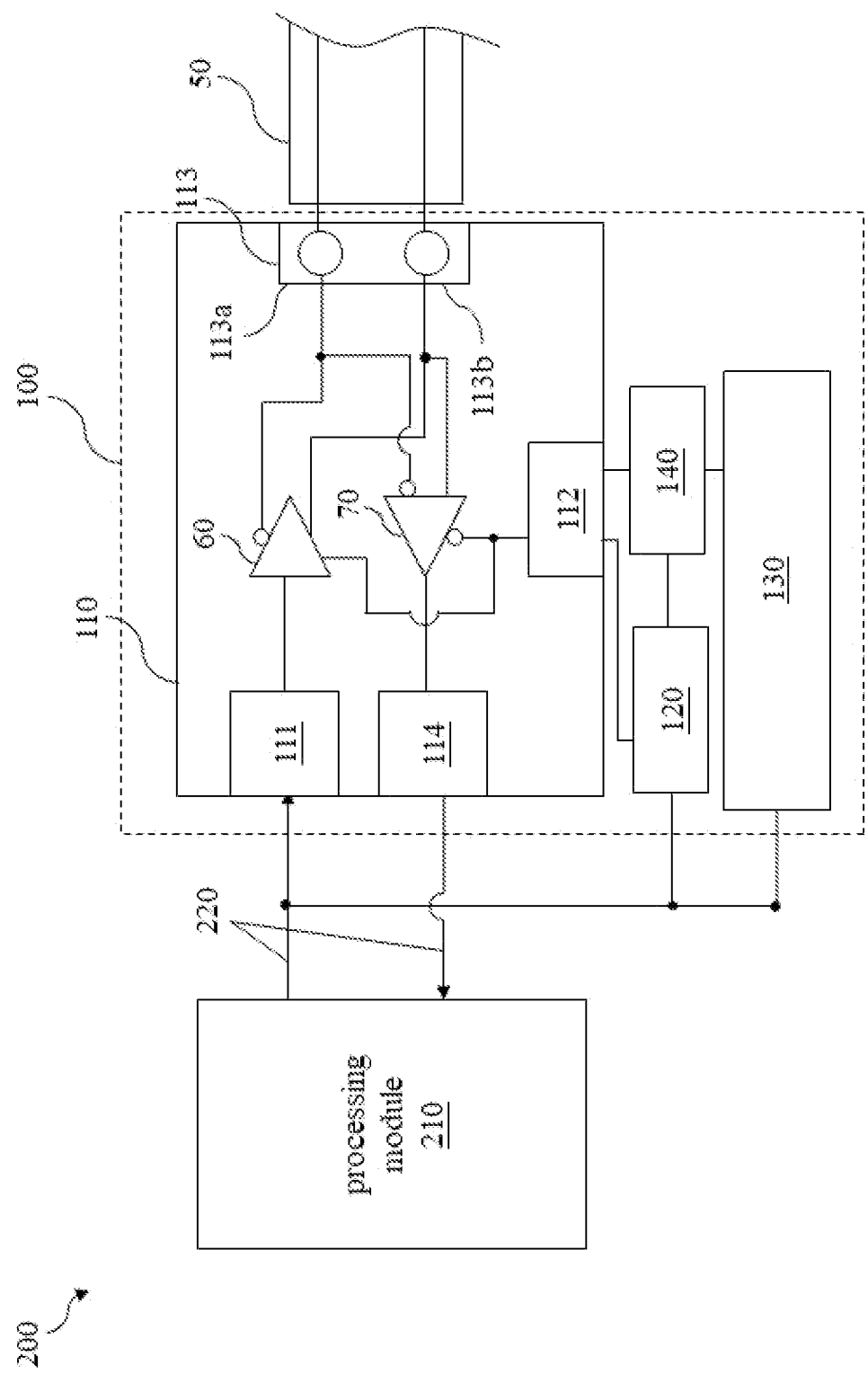
FIG. 5 is a block diagram of a communication system according to an embodiment of the present disclosure.

Please refer to FIG. 5, which is a block diagram of a communication system according to an embodiment of the present disclosure. In this embodiment, the communication system 200 comprises a processing module 210, a communication bus 220, and the RS-485 circuit 100, wherein the RS-485 circuit 100 is connected to the processing module 210 through the communication bus 220. The data input terminal 111 receives the data signal from the processing module 210 through the communication bus 220, and the data output terminal 114 outputs another data signal to the processing module 210 through the communication bus 220. The processing module 210 may be, but is not limited to, a microprocessor, a central processing unit or a single-chip microcomputer. The communication bus 220 may be, but is not limited to, a universal asynchronous receiver/transmitter (UART) bus. The RS-485 circuit 100 may be, but is not limited to, the RS-485 circuit 100 described in any one of FIGS. 1 to 4.

Therefore, when data is transmitted and received between multiple electronic devices equipped with the RS-485 circuit 100 or the communication system 200 of the embodiment of the present disclosure, the RS-485 interface chip 110 of the electronic device that transmits the data may be switched to be in the data transmitting state due to the signal state transition of the data input terminal 111, while the RS-485 interface chip 110 of other electronic devices receiving the data remains in the data receiving state since there is no signal state transition of the data input terminal 111, so that the electronic devices may successfully complete the data transmission and reception. When the electronic device that transmits the data completes the data transmission or after the electronic device transmitting the data is in the data transmitting state and maintains the preset time, based on the expiration of the counter 140, the RS-485 interface chip 110 of the electronic device that transmits the data may be switched to be in the data receiving state.

In summary, the RS-485 circuit of the embodiment of the present disclosure may automatically determine the data transmission direction and transmission time of the RS-485 interface chip in a hardware mode, so as to avoid errors in data transmission because the transmission direction is switched before the data is completely transmitted or the transmission direction is not switched in time after the data transmission is completed, and solve the problems of increasing the workload of software development, wasting human resources for research and development, and wasting the I/O resources of the processing module since it is necessary to add additional I/O ports and software codes to the processing module of the device to control the state switching. In addition, by setting the preset counting information, after the RS-485 circuit of the embodiment of the present disclosure of the electronic device is switched to be in the data transmitting state and maintains the preset time, it automatically is switched back to the data receiving state. Furthermore, by setting the edge detector and the baud rate monitor, after the RS-485 circuit of the embodiment of the present disclosure of the electronic device is switched to be in the data transmitting state and the data transmission is completed, it automatically is switched back to the data receiving state. Moreover, by setting the multiplexer, after the RS-485 circuit of the embodiment of the present disclosure of the electronic device is switched to be in the data transmitting state, it may be selectively automatically switched back to be in the data receiving state after the preset time has elapsed or after the data transmission is completed.

Although the above-described components are depicted in the drawings of the present disclosure, it cannot be excluded that more other additional elements may be used to achieve better technical effects without departing from the spirit of the present disclosure.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. An RS-485 circuit, which is disposed in an electronic device comprising a processing module, and the RS-485 circuit comprising:
   an RS-485 interface chip, comprising:
      a data input terminal configured to receive a data signal from the processing module; and
      an enable terminal configured to receive a start signal to make the RS-485 interface chip in a data transmitting state; and receive a switching signal to make the RS-485 interface chip in a data receiving state;
   a start detector connected to the data input terminal and the enable terminal, and configured to detect a first signal edge of the data signal to generate the start signal to the enable terminal;
   a control module connected to the data input terminal, and configured to output first counting information after detecting the first signal edge of the data signal; and a counter connected to the control module and the enable terminal, and configured to count based on the first counting information, and output the switching signal to the enable terminal when the count expires;

wherein the control module comprises an edge detector connected to the data input terminal, and configured to continuously detect a signal edge of the data signal; and a baud rate monitor connected to the edge detector, the data input terminal and the counter, and configured to continuously obtain a current baud rate based on the data signal after the edge detector detects the signal edge of the data signal, and obtain a current counting information as the first counting information based on the data signal and the current baud rate, so as to output the first counting information to the counter.

2. The RS-485 circuit according to claim 1, wherein the first counting information is a preset counting information.

3. The RS-485 circuit according to claim 1, wherein the baud rate monitor is further configured to monitor a data length of the data signal, continuously obtain the current baud rate according to a detection result of the edge detector after the edge detector detects the signal edge of the data signal, and output the current counting information based on the data length and the current baud rate.

4. The RS-485 circuit according to claim 1, wherein the RS-485 interface chip further comprises a differential signal transceiver terminal; when the RS-485 interface chip is in the data transmitting state, the RS-485 interface chip -485 interface chip outputs a differential signal to an RS-485 bus through the differential signal transceiver terminal based on the data signal; and when the RS-485 interface chip is in the data receiving state, the RS-485 interface chip receives another differential signal from the RS-485 bus through the differential signal transceiver terminal.

5. The RS-485 circuit according to claim 4, wherein the RS-485 interface chip further comprises a data output terminal; and when the RS-485 interface chip is in the data receiving state, the RS-485 interface chip outputs another data signal through the data output terminal based on the another differential signal.

6. The RS-485 circuit according to claim 1, wherein when detecting the first signal edge of the data signal, the start detector generates another start signal to the counter to start the counter.

7. The RS-485 circuit according to claim 1, wherein the first signal edge is a falling edge or a rising edge.

8. The RS-485 circuit according to claim 1, wherein the start signal is a high-level signal, and the switching signal is a low-level signal.

9. The RS-485 circuit according to claim 1, wherein the start signal is a low-level signal, and the switching signal is a high-level signal.

10. A communication system, comprising:
a processing module;
a communication bus; and
an RS-485 circuit connected to the processing module through the communication bus, and comprising:
an RS-485 interface chip, comprising:
a data input terminal configured to receive a data signal from the processing module; and
an enable terminal configured to receive a start signal to make the RS-485 interface chip in a data transmitting state; and receive a switching signal to make the RS-485 interface chip in a data receiving state;
a start detector connected to the data input terminal and the enable terminal, and configured to detect a first signal edge of the data signal to generate the start signal to the enable terminal;
a control module connected to the data input terminal, and configured to output first counting information after detecting the first signal edge of the data signal; and
a counter connected to the control module and the enable terminal, and configured to count based on the first counting information, and output the switching signal to the enable terminal when the count expires;
wherein the control module comprises an edge detector connected to the data input terminal, and configured to continuously detect a signal edge of the data signal; and a baud rate monitor connected to the edge detector, the data input terminal and the counter, and configured to continuously obtain a current baud rate based on the data signal after the edge detector detects the signal edge of the data signal, and obtain a current counting information as the first counting information based on the data signal and the current baud rate, so as to output the first counting information to the counter.

11. The RS-485 circuit according to claim 10, wherein the baud rate monitor is further configured to monitor a data length of the data signal, continuously obtain the current baud rate according to a detection result of the edge detector after the edge detector detects the signal edge of the data signal, and output the current counting information based on the data length and the current baud rate.

12. The communication system according to claim 10, wherein the RS-485 interface chip further comprises a differential signal transceiver terminal; when the RS-485 interface chip is in the data transmitting state, the RS-485 interface chip -485 interface chip outputs a differential signal to an RS-485 bus through the differential signal transceiver terminal based on the data signal; and when the RS-485 interface chip is in the data receiving state, the RS-485 interface chip receives another differential signal from the RS-485 bus through the differential signal transceiver terminal.

13. The communication system according to claim 12, wherein the RS-485 interface chip further comprises a data output terminal; and when the RS-485 interface chip is in the data receiving state, the RS-485 interface chip outputs another data signal through the data output terminal based on the another differential signal.

14. The communication system according to claim 10, wherein when detecting the first signal edge of the data signal, the start detector generates another start signal to the counter to start the counter.

15. An RS-485 circuit, which is disposed in an electronic device comprising a processing module, and the RS-485 circuit comprising:
an RS-485 interface chip, comprising:
a data input terminal configured to receive a data signal from the processing module; and
an enable terminal configured to receive a start signal to make the RS-485 interface chip in a data transmitting state; and receive a switching signal to make the RS-485 interface chip in a data receiving state;
a start detector connected to the data input terminal and the enable terminal, and configured to detect a first signal edge of the data signal to generate the start signal to the enable terminal;

a control module connected to the data input terminal, and configured to output first counting information after detecting the first signal edge of the data signal; and a counter connected to the control module and the enable terminal, and configured to count based on the first counting information, and output the switching signal to the enable terminal when the count expires;

wherein the control module comprises an edge detector connected to the data input terminal, and configured to continuously detect a signal edge of the data signal; a baud rate monitor connected to the edge detector and the data input terminal, and configured to continuously obtain a current baud rate according to the data signal after the edge detector detects the signal edge of the data signal, and obtain current counting information based on the data signal and the current baud rate; a memory configured to store a preset counting information; and a multiplexer connected to the baud rate monitor, the memory and the counter, and configured to select one of the preset counting information and the current counting information as the first counting information according to the control of a selection signal, and output the first counting information to the counter.

16. The RS-485 circuit according to claim 15, wherein the baud rate monitor is further configured to monitor a data length of the data signal, continuously obtain the current baud rate according to a detection result of the edge detector after the edge detector detects the signal edge of the data signal, and output the current counting information based on the data length and the current baud rate.

17. A communication system, comprising:
a processing module;
a communication bus; and
an RS-485 circuit connected to the processing module through the communication bus, and comprising:
an RS-485 interface chip, comprising:
a data input terminal configured to receive a data signal from the processing module; and
an enable terminal configured to receive a start signal to make the RS-485 interface chip in a data transmitting state; and receive a switching signal to make the RS-485 interface chip in a data receiving state;

a start detector connected to the data input terminal and the enable terminal, and configured to detect a first signal edge of the data signal to generate the start signal to the enable terminal;

a control module connected to the data input terminal, and configured to output first counting information after detecting the first signal edge of the data signal; and a counter connected to the control module and the enable terminal, and configured to count based on the first counting information, and output the switching signal to the enable terminal when the count expires;

wherein the control module comprises an edge detector connected to the data input terminal, and configured to continuously detect a signal edge of the data signal; a baud rate monitor connected to the edge detector and the data input terminal, and configured to continuously obtain a current baud rate according to the data signal after the edge detector detects the signal edge of the data signal, and obtain current counting information based on the data signal and the current baud rate; a memory configured to store a preset counting information; and a multiplexer connected to the baud rate monitor, the memory and the counter, and configured to select one of the preset counting information and the current counting information as the first counting information according to the control of a selection signal, and output the first counting information to the counter.

18. The communication system according to claim 17, wherein the baud rate monitor is further configured to monitor a data length of the data signal, continuously obtain the current baud rate according to a detection result of the edge detector after the edge detector detects the signal edge of the data signal, and output the current counting information based on the data length and the current baud rate.

* * * * *